United States Patent [19]

Cuellar et al.

[11] Patent Number: 4,962,996
[45] Date of Patent: Oct. 16, 1990

[54] PROTECTED FIBER OPTIC WAVEGUIDE

[75] Inventors: Enrique Cuellar, Palo Alto; Stephen F. Powell, Woodside; Daniel R. Roberts, San Mateo; Pravin L. Soni, Union City, all of Calif.

[73] Assignee: Raychem Corporation, Menlo Park, Calif.

[21] Appl. No.: 372,109

[22] Filed: Jun. 28, 1989

Related U.S. Application Data

[63] Continuation of Ser. No. 96,108, Sep. 11, 1987, abandoned.

[51] Int. Cl.$^5$ ............................. G02B 6/02; G02B 1/04
[52] U.S. Cl. ............................... 350/96.34; 350/96.30; 428/447; 525/477
[58] Field of Search ............................. 350/96.34, 96.30; 428/375, 447, 373, 392; 525/477

[56] References Cited

U.S. PATENT DOCUMENTS

| | | | |
|---|---|---|---|
| 4,155,864 | 5/1979 | Martin | 252/63.7 |
| 4,287,114 | 9/1981 | Itoh et al. | 525/477 |
| 4,444,940 | 4/1984 | Polmanteer | 524/500 |
| 4,517,238 | 5/1985 | Mine et al. | 428/447 |
| 4,642,265 | 2/1987 | Suzuki | 428/375 |
| 4,693,553 | 9/1987 | Sasaki et al. | 350/96.34 |
| 4,762,392 | 8/1988 | Yamamoto et al. | 350/96.34 X |
| 4,768,860 | 9/1988 | Tatsukami et al. | 350/96.34 |
| 4,778,244 | 10/1988 | Ryan | 350/96.34 X |
| 4,783,140 | 11/1988 | Osawa et al. | 350/96.30 X |

FOREIGN PATENT DOCUMENTS

| | | |
|---|---|---|
| 0159729 | 3/1985 | European Pat. Off. . |
| 0192275 | 2/1986 | European Pat. Off. . |
| 2513426 | 3/1983 | France . |

OTHER PUBLICATIONS

Cuellar et al, "Static Fatigue Lifetime of Optical Fibers in Bending" presented at First Military Fiber Optics and Communications Conference, Washington, D.C., Mar. 16-19, 1987.

Imai, "Silicone Coating Material for Optical Fibers", Toshiba Review 38, 171-174 (1/1983) with translation.

*Primary Examiner*—John D. Lee
*Assistant Examiner*—Phan T. Heartney
*Attorney, Agent, or Firm*—Herbert G. Burkard; Yuan Chao

[57] ABSTRACT

A protected fiber optic waveguide comprising:
(I) a core;
(II) a cladding disposed on, around, and in contact with the exterior surface of the core; and
(III) a buffer coating disposed on, around, and in contact with the exterior surface of the cladding, the buffer coating comprising a polysiloxane material comprising:
  (a) a polydimethylsiloxane and
  (b) a copolysiloxane comprising
    (i) a repeat unit selected from the group consisting of methylphenylsiloxane and diphenylsiloxane and
    (ii) a dimethylsiloxane repeat unit,
    the molar ratio of units (i) to units (ii) being between about 10:90 and about 80:20 if unit (i) is methylphenylsiloxane and between about 5:95 and about 50:50 if unit (i) is diphenylsiloxane;
  the weight ratio of polydimethylsiloxane (a) to copolysiloxane (b) being between about 5:95 and about 85:15.

12 Claims, 2 Drawing Sheets

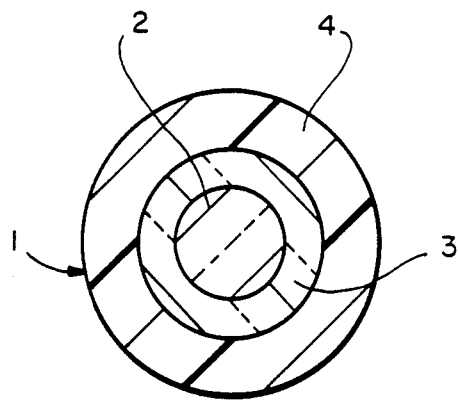
FIG_1
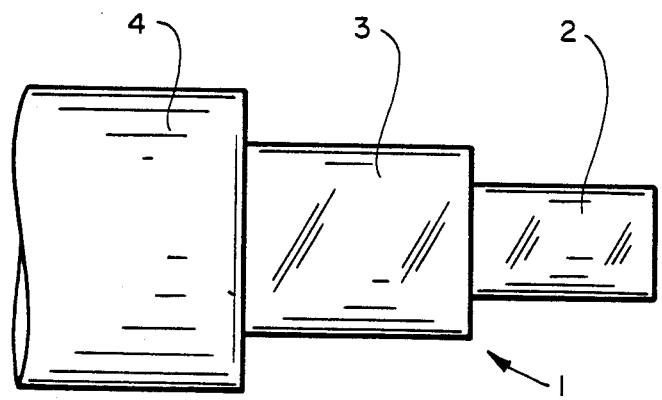
FIG_2

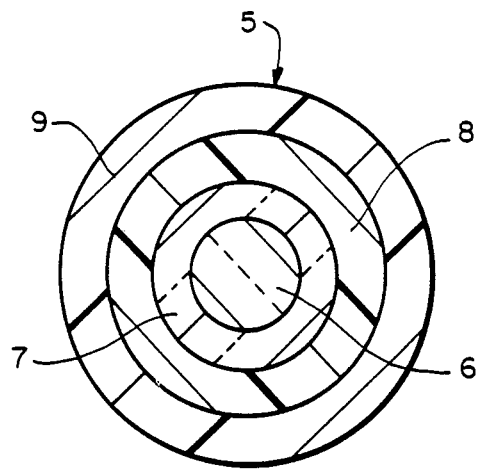
FIG_3
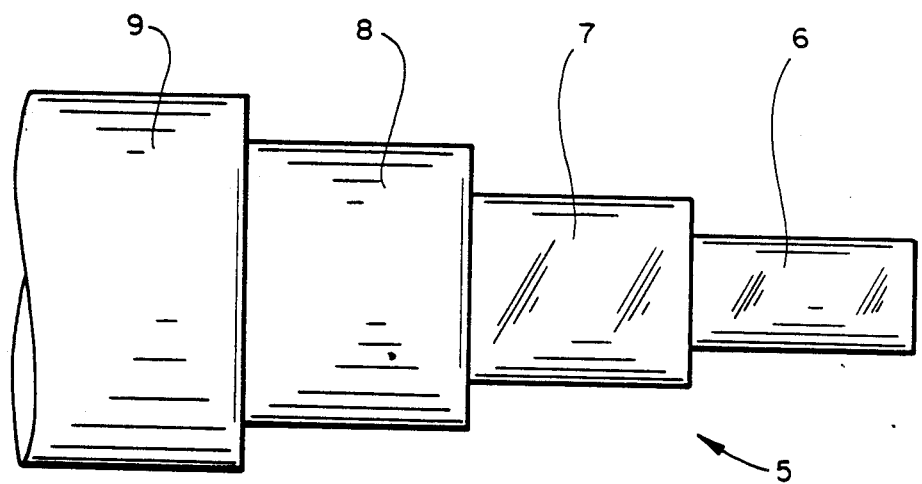
FIG_4

PROTECTED FIBER OPTIC WAVEGUIDE

This application is a continuation of application Ser. No. 07/096,108, filed Sept. 11, 1987 (abandoned).

BACKGROUND OF THE INVENTION

This invention relates to a phenyl-containing polysiloxane material, and in particular a fiber optic waveguide protected by such a material.

The use of fiber optics for transmitting information has recently received a great deal of attention because of the light weight, security, safety, and electrical isolation that can be obtained with a fiber optic system, and the enormous amount of information that can be transmitted through each fiber of a fiber optic system. Fiber optic systems use a waveguide for transmitting light between a light emitter and a light detector. Waveguides consisting of a variety of materials have been developed. For example, waveguides consisting of a glass core and a glass cladding, a glass cladding and a liquid core, a polymeric core and a polymeric cladding, and a glass core and a polymeric cladding are known.

Typically, a fiber optic waveguide has a buffer coating (or fiber buffer) surrounding it and immediately adjacent to the cladding, to provide mechanical isolation and protection. Additionally, the buffer coating may act as a cladding mode stripper—that is, it permits light being transmitted in the cladding of the fiber to leave the cladding, thereby removing the cladding propagation modes without disturbing the core-supported propagation modes. For a buffer coating to be an effective cladding mode stripper, it should have a refractive index greater than that of the cladding (for glass cladding, greater than about 1.45). It has been proposed to use polysiloxane buffer coatings. See, generally, Cuellar et al., "Static Fatigue Lifetime of Optical Fibers in Bending," presented at the First Military Fiber Optics and Communications Conference, Washington, D.C., Mar. 16-19, 1987, and Imai, "Silicone Coating Material for Optical Fibers," Toshiba Review 38, 171-174 (1983). One polysiloxane which has been used is polydimethylsiloxane, a readily available material, but with a relatively low refractive index of about 1.40. Phenylated polysiloxanes have also been proposed as buffer coatings. Compared to polydimethylsiloxane, they possess the advantage of higher refractive index (typically greater than 1.45).

Another important function of the buffer coating is to protect the fiber against static fatigue. Further, the buffer coating must be readily stripped off the fiber, leaving behind a clean, exposed but undamaged fiber, as would be necessary in preparing the fiber for making splices, joints, or terminations.

This invention provides a polysiloxane buffer coating which has high refractive index, confers high static fatigue resistance to an optical fiber, and is readily stripped off the fiber.

SUMMARY OF THE INVENTION

This invention provides a protected fiber optic waveguide comprising:
(I) a core;
(II) a cladding disposed on, around, and in contact with the exterior surface of the core; and
(III) a buffer coating disposed on, around, and in contact with the exterior surface of the cladding, the buffer coating comprising a polysiloxane material comprising:
  (a) a polydimethylsiloxane and
  (b) a copolysiloxane comprising
    (i) a repeat unit selected from the group consisting of methylphenylsiloxane and diphenylsiloxane and
    (ii) a dimethylsiloxane repeat unit,
      the molar ratio of units (i) to units (ii) being between about 10:90 and about 80:20 if unit (i) is methylphenylsiloxane and between about 5:95 and about 50:50 if unit (i) is diphenylsiloxane;
      the weight ratio of polydimethylsiloxane (a) to copolysiloxane (b) being between about 5:95 and about 85:15.

This invention also provides a method of making a protected fiber optic waveguide, comprising the steps of:
(I) providing a fiber optic waveguide comprising a core having a cladding disposed on, around, and in contact with the exterior surface of the core;
(II) applying an uncured buffer coating around and in contact with the exterior surface of the cladding, the buffer coating comprising a polysiloxane material comprising:
  (a) a polydimethylsiloxane and
  (b) a copolysiloxane comprising
    (i) a repeat unit selected from the group consisting of methylphenylsiloxane and diphenylsiloxane and
    (ii) a dimethylsiloxane repeat unit,
      the molar ratio of units (i) to units (ii) being between about 5:95 and about 80:20 if unit (i) is methylphenylsiloxane and between about 5:95 and about 50:50 if unit (i) is diphenylsiloxane;
      the weight ratio of polydimethylsiloxane (a) to copolysiloxane (b) being between about 5:95 and about 85:15; and
(III) heating the waveguide-buffer coating combination to a predetermined temperature between about 100° and about 250° C., to cure the buffer coating.

BRIEF DESCRIPTION OF THE DRAWINGS

FIG. 1 depicts, in a cut-away view, a protected fiber optic waveguide of this invention. FIG. 2 depicts the same waveguide in a cross-sectional view.

FIG. 3 depicts, in a cut-away view, a preferred embodiment of this invention, in which the fiber optic waveguide is protected by both a buffer coating and overcoating. FIG. 4 depicts the same embodiment in a cross-sectional view.

DETAILED DESCRIPTION OF THE INVENTION

Polydimethylsiloxane buffer coatings, while desirable in many respects, have a relatively low refractive index, about 1.40, and provide a relatively low level of static fatigue resistance to glass fibers over which they are deposited. Conversely, phenylated polysiloxanes have a desirably high refractive index, over 1.45. It has been further discovered that the latter provide superior static fatigue resistance but have poor mechanical strippability—that is, they can be stripped off the cladding only with difficulty, because of their crumbly, "cheesy" texture, while polydimethylsiloxane excels in this regard. It has been unexpectedly discovered that, by making a buffer coating comprising a blend of a polydimethylsiloxane and a phenylated polysiloxane, a buffer coating having high refractive index and superior static fatigue resistance and mechanical strippability is obtained, even though the two siloxane materials are incompatible, as evidenced by the turbidity of the blend. Most surprisingly, substantially improved mechanical strippability is obtained with only a relatively small amount of polydimethylsiloxane, typically about 20 parts by weight to 80 parts by weight of phenylated polysiloxane.

Polysiloxane materials which are suitable as buffer coatings according to this invention comprise
(a) a polydimethylsiloxane and
(b) a copolysiloxane comprising
  (i) a repeat unit selected from the group consisting of methylphenylsiloxane and diphenylsiloxane and
  (ii) a dimethylsiloxane repeat unit,
  the molar ratio of units (i) to units (ii) being between about 10:90 and about 80:20 if unit (i) is methylphenylsiloxane and between about 5:95 and about 50:50 if unit (i) is diphenylsiloxane;
the weight ratio of polydimethylsiloxane (a) to copolysiloxane (b) being between about 5:95 and about 85:15.

Polydimethylsiloxane (a) has a repeat unit

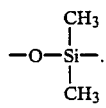

Typically, it has vinyl (—CH=CH$_2$) and hydride (—Si—H) end groups for crosslinking and/or curing, as described in more detail hereinbelow. Additionally, for the same purposes, it may have methylvinylsiloxane repeat units:

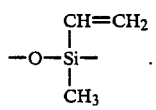

An example of a suitable polysiloxane (a) is available under the tradename Shin Etsu KE 106.

Copolysiloxane (b) is a phenylated copolysiloxane, having methylphenylsiloxane

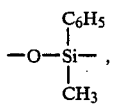

and/or diphenylsiloxane

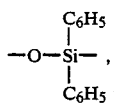

repeat units copolymerized with dimethylsiloxane repeat units. The copolymer may be random, block, or alternating. Preferably, the molar ratio of phenylated repeat units (i) to dimethyl repeat units (ii) is between about 30:70 and about 80:20 if unit (i) is methylphenylsiloxane and between about 20:80 and about 50:50 if unit (i) is diphenylsiloxane; Typically, it has vinyl (—CH=CH$_2$) and hydride (—Si—H) end groups for crosslinking and/or curing, as described in more detail hereinbelow. Additionally, for the same purposes, it may have methylvinylsiloxane repeat units. Suitable copolysiloxanes (b) are available under the trade names Toshiba XE 5844, Petrarch PS 2066, Shin Etsu OF 113, McGhan Nusil 8170, and CFI 6755.

The weight ratio of polydimethylsiloxane (a) to copolysiloxane (b) preferably is between about 10:90 and about 50:50, and more preferably is between about 15:85 and about 40:60. Those skilled in the art will appreciate that typically polysiloxanes (a) and (b) are used as a two-part system, the parts commonly being designated Part A and Part B and being mutually reactive, which are mixed immediately before use in proportions suitable to achieve the desired level of cure. Where in this specification a particular amount of polysiloxane (a) or (b) is recited, it is to be understood that this means the combined amounts of Parts A and B, in the appropriate stoichiometry.

FIGS. 1 and 2 depict, in cut-away and cross-sectional views, respectively, a protected fiber optic waveguide 1 of this invention. The core 2 is surrounded by a cladding 3, which in turn is surrounded by a buffer coating 4 having a composition as described herein.

The buffer coating is typically applied in an uncured state over the fiber and then is cured according to the following equation:

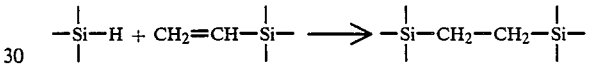

Cure may be effected by a platinum catalyst, for example hexachloroplatinic acid, or by a peroxide, as is well known in the art. Generally, the coated fiber is passed through an oven preheated to a temperature of between about 100° and about 250° C., preferably between about 125° and about 200° C. to cure the buffer coating. The uncured buffer coating may be applied "neat", that is, as a pure liquid. Alternatively, it may be dissolved in a volatile solvent, such as methylisobutylketone, in which case during the heating cycle the solvent is simultaneously evaporated while the buffer coating is cured. Those skilled in the art will appreciate that, by varying the level of crosslinking, the physical properties of the coating may be varied. For example, a higher level of crosslinking would lead to a higher tensile strength material.

Surprisingly, the buffer coating of this invention has a milky white appearance, indicating that the polydimethylsiloxane (a) and the copolysiloxane (b) are incompatible and form separate phases, but without deleteriously affecting the optical properties of the fiber. Preferably, the dispersion should be made in such a manner that the dispersed phase form domains of less than 1 um. The opacity of the buffer coating of this invention is also advantageous in that it prevents ambient light from entering the fiber and interfering with the signal, as would be in the case of a clear buffer coating.

In a preferred embodiment of the invention, a buffer overcoating is disposed on, around, and in contact with the buffer coating. The buffer overcoating provides additional mechanical protection. It preferably comprises a relatively soft material which is readily deformable, thereby acting to shield the core and the cladding from externally applied pressure. Polydimethylsiloxane is a preferred overcoating material. This embodiment is depicted, in cut-away and cross-sectional views, respectively, in FIGS. 3 and 4. Protected waveguide 5 comprises a core 6, successively surrounded by cladding 7, buffer coating 8, and buffer overcoating 9.

The core is made of a light transmissive material, such as liquid, glass, or polymer. The cladding is made of a material having a lower index of refraction than the core, and may be made of glass or polymer. Preferably, both the core and the cladding are made of glass.

Materials such as fumed silica (available under the tradename Cab-O-Sil) may be added to enhance the toughness of the buffer coating. Typically, it is used in an amount of between about 1 and about 20 percent by weight, relative to buffer coating material, although greater or lesser amounts could be used to suit a particular application, as would be readily determinable by those skilled in the art, When stripping off the buffer coating, for example to prepare a fiber end for splicing, the coating desirably is completely removed, leaving no residue on the cladding surface and without damaging the fiber. The strippability of various buffer coatings may be evaluated by actually preparing fibers with the different buffer coatings and test-stripping with a stripping tool such as Acrylate Stripper No. 84201.6000 (Ericsson Light Wave, Kans.). However, such a procedure is not efficient for the evaluation of a large number of different materials in a short period of time. It has been discovered that the strippability of a particular buffer coating material may be related to its mechanical properties, the ones having better mechanical properties being more easily strippable. Table I shows the effect incremental amounts of a poly(dimethylsiloxane) (Shin Etsu KE 106) on the mechanical properties (and, consequently, the strippability) of a dimethylsiloxane-diphenylsiloxane copolymer (Toshiba XE 5844):

TABLE I

| Toshiba XE 5844 (w %) | Shin Etsu KE 106 (w %) | Tensile Strength (kg/cm$^2$) | Elongation (%) |
| --- | --- | --- | --- |
| 100 | — | 1.2 | 26 |
| 98 | 2 | 1.3 | 38 |
| 95 | 5 | 2.0 | 55 |
| 90 | 10 | 2.3 | 60 |
| 80 | 20 | 3.5 | 76 |

The mechanical strippability of a buffer coating material may also be correlated to its compressive strength. According to this parameter, the material of this invention is also superior. Polysiloxane was cast into slabs 95 mils (0.095 in.) thick. A 1×1 inch piece of this slab was subjected to compressive strength testing on an Instron testing machine, using a 0.2 inch diameter mandrel and a crosshead speed of 0.04 in/min. Compressive strength, defined as the load at which the sample failed (as indicated by an abrupt drop in the load v. elongation curve, was determined. The results are provided in Table II. They show that the compressive strength of Toshiba XE 5844 was the lowest of the materials tested, in line with is poor strippability and that its compressive strength can be significantly improved by blending in Shin Etsu KE 106 material.

TABLE II

| Toshiba XE 5844 (w %) | Shin Etsu KE 106 (w %) | Compressive Strength (lb.) |
| --- | --- | --- |
| 100 | — | 7.1 |
| 90 | 10 | 10.6 |

TABLE II-continued

| Toshiba XE 5844 (w %) | Shin Etsu KE 106 (w %) | Compressive Strength (lb.) |
| --- | --- | --- |
| 80 | 20 | >15.4 |
| — | 100 | >110 |

Static fatigue may cause an optical fiber to eventually break under an applied load which, on a short term basis, would not be sufficient to break the fiber. A method of testing the static fatigue resistance of a fiber is to place it in a two-point bending mode between fixed plates and measure its time to failure under predetermined conditions, as described in Cuellar et al., cited supra and incorporated herein by reference.

The static fatigue resistance of an optical fiber having a buffer coating made of a blend according to this invention (20 wt % polydimethylsiloxane (Shin Etsu KE 106) and 80 wt % of a copolysiloxane having diphenylsiloxane groups (Toshiba XE 5844)) was compared against the static fatigue resistance of optical fibers having buffer coatings made from either unblended polydimethylsiloxane or copolysiloxane. The fiber with the blended buffer coating was found to have a lifetime approaching that of the one with the copolysiloxane coating.

We claim:

1. A protected fiber optic waveguide comprising:
   (I) a core;
   (II) a cladding disposed on, around, and in contact with the exterior surface of the core; and
   (III) a buffer coating disposed on, around, and in contact with the exterior surface of the cladding, the buffer coating comprising a polysiloxane material comprising:
      (a) a polydimethylsiloxane and
      (b) a copolysiloxane comprising
         (i) a repeat unit selected from the group consisting of methylphenylsiloxane and diphenylsiloxane and
         (ii) a dimethylsiloxane repeat unit,
         the molar ratio of units (i) to units (ii) being between about 10:90 and about 80:20 if unit (i) is methylphenylsiloxane and between about 5:95 and about 50:50 if unit (i) is diphenylsiloxane;
         the weight ratio of polydimethylsiloxane (a) to copolysiloxane (b) being between about 20:80 and about 85:15.

2. A protected waveguide according to claim 1, wherein repeat unit (i) is methylphenylsiloxane.

3. A protected waveguide according to claim 2, wherein the molar ratio of repeat units (i) to repeat units (ii) is between about 30:70 and about 80:20.

4. A protected waveguide according to claim 1, wherein repeat unit (i) is diphenylsiloxane.

5. A protected waveguide according to claim 4, wherein the molar ratio of repeat units (i) to repeat units (ii) is between about 20:80 and about 50:50.

6. A protected waveguide according to claim 1, wherein the weight ratio of polydimethylsiloxane (a) to copolysiloxane (b) being between about 10:90 and about 50:50.

7. A protected waveguide according to claim 1, wherein the weight ratio of polydimethylsiloxane (a) to copolysiloxane (b) being between about 15:85 and about 40:60.

8. A protected waveguide according to claim 1, wherein in the buffer coating has been cured by the reaction of vinyl and hydride curing sites.

9. A protected waveguide according to claim 1, wherein the buffer coating further comprises fused silica.

10. A protected waveguide according to claim 1, further comprising a buffer overcoating disposed on, around, and in contact with the buffer coating.

11. A protected waveguide according to claim 1, wherein the buffer overcoating comprises polydimethylsiloxane.

12. A protected waveguide according to claim 1, wherein the core and the cladding are each made of glass.

* * * * *

UNITED STATES PATENT AND TRADEMARK OFFICE

CERTIFICATE OF CORRECTION

PATENT NO. : 4,962,996

INVENTOR(S) : Cuellar et al.

DATED : October 16, 1990

It is certified that error appears in the above-identified patent and that said Letters Patent is hereby corrected as shown below:

Column 5, line 24, replace "Kans." by --Kansas.--.

Column 6, line 5, delete ">" before "15.4.

Signed and Sealed this

First Day of February, 1994

Attest:

BRUCE LEHMAN

*Attesting Officer*     *Commissioner of Patents and Trademarks*